C. V. WALLER.
LOCKING NUT.
APPLICATION FILED JUNE 12, 1916.

1,204,623.

Patented Nov. 14, 1916.

Witness:
Harry S. Gaither

Inventor:
Charles V. Waller,
by Chamberlin Freudenreich
Attys

UNITED STATES PATENT OFFICE.

CHARLES V. WALLER, OF CHICAGO, ILLINOIS.

LOCKING-NUT.

1,204,623.　　　　　　Specification of Letters Patent.　　Patented Nov. 14, 1916.

Application filed June 12, 1916. Serial No. 103,067.

*To all whom it may concern:*

Be it known that I, CHARLES V. WALLER, a citizen of the United States, residing at Chicago, county of Cook, State of Illinois, have invented a certain new and useful Improvement in Locking-Nuts, and declare the following to be a full, clear, and exact description of the same, such as will enable others skilled in the art to which it pertains to make and use the same, reference being had to the accompanying drawings, which form a part of this specification.

One of the types of nut locks that has long been tried in one form or another is that in which the nut is made self locking by the presence of a key arranged in a keyway opening out of the nut opening and containing a portion of the threads of the nut; the key being adapted to project beyond one or both faces of the nut so that a relative movement in the axial direction between the nut and the key will be produced when the nut is screwed home. All forms of this type of locking nut that have come to my attention are open to various objections, one common to all of them being the expense of making the device. Other objections to some of the old devices is that they do not provide means for taking up wear; or do not give access to the outer end of the key to enable the workman to release the key after turning the nut back somewhat, in case the locking device does not release itself; or that the keys are not held in place with sufficient security to prevent their loss when the nut is off the bolt.

The object of the present invention is to produce a locking nut of the aforesaid type which shall cost practically the same as an ordinary nut and be free from objections to prior devices of this kind.

Figure 1:
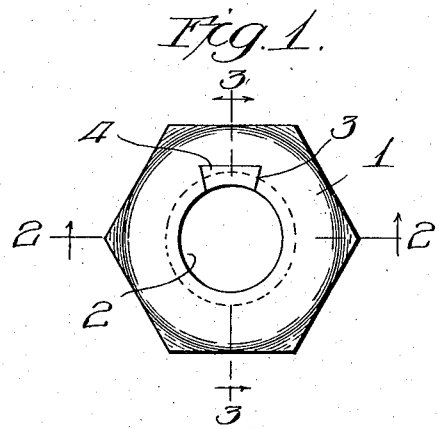
Figure 2:
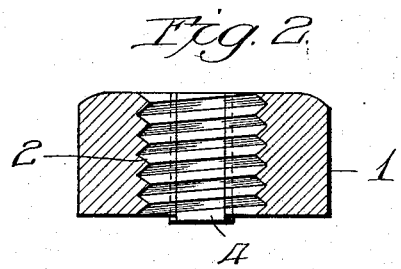
Figure 3:
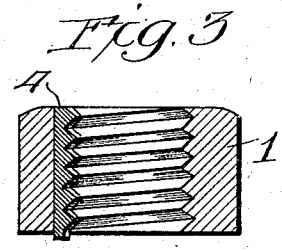

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is a top plan view of a nut arranged in accordance with my invention; Fig. 2 is a section on line 2—2 of Fig. 1; and Fig. 3 is a section on line 3—3 of Fig. 1.

Referring to the drawing, 1 represents a nut of any suitable size or shape having at one side of the nut opening, 2, and communicating therewith, a dovetail keyway, 3, lying parallel with the axis of the nut and extending entirely through the same from the upper face to the under face; the keyway being uniform in cross section so that it may be produced in the punching press which punches the hole in the nut blank instead of requiring one or more separate operations of boring, planing or other machine work. In the keyway is a key, 4, which is simply a short piece of unfinished rolled bar material; the bars being rolled of the proper cross section to fit snugly into the keyway and, after the nut blanks have been punched, being pushed into the keyways in the nut blanks and then cut off or, if desired, being cut into short lengths and placed in position in the form of individual keys. Each key is cut slightly longer than the thickness of the nut so that it will project slightly from beyond the under face of the nut as is contemplated in this type of device. After the key has been placed into the blank the nut is threaded in the usual way.

It will be seen that the punching of the keyway and the employment of a simple rolled section for the keys makes the cost of adding the locking feature so slight as to be hardly appreciable. Another advantage that results from this construction is that the keyway and the key will possess just enough roughness to cause the key to be securely held while the thread is being cut and thereafter until the nut is placed on a bolt; the grip on the key being, however, of such a character that the key will readily yield when its inner end engages the face of the work and therefore there will be no energy wasted in the mere act of producing a relative movement between the key and the nut as is the case where there is a wedging action.

The key will hold the nut firmly locked and prevent it from being jarred loose but will not prevent the nut from being backed off when a proper wrench is used. In backing off the nut by means of a wrench, the key should release itself but, if it does not, a slight tap on the outer end will effect the release. Furthermore, by reason of the length of the key an amount equal to one or more complete threads may be cut from the end in order to make the device operative in case it should have been damaged on the inner end after repeated use.

I claim:

1. A nut having a dovetail keyway uniform in cross section extending entirely through the same from top to bottom beside and opening into the nut-opening, and a key of the same cross section as the keyway and slightly longer than the thickness of the nut located in said keyway, the threads in the nut being formed partly in the key and partly in the body of the nut.

2. A nut having a dovetail keyway uniform in cross section extending entirely through the same parallel with the axis of the nut and opening into the nut-opening, and a key in the form of a simple bar of uniform cross section and slightly longer than the thickness of the nut held frictionally in said keyway, the threads in the nut being formed partly in the key and partly in the body of the nut.

3. A nut having a dovetail keyway uniform in cross section punched entirely through the same parallel with the axis of the nut and opening into the nut-opening, and a key comprising a short piece of an unfinished rolled bar of the same cross section as the keyway and slightly longer than the thickness of the nut held frictionally in said keyway, the threads in the nut being formed partly in the key and partly in the body of the nut.

In testimony whereof I sign this specification.

CHARLES V. WALLER.

Copies of this patent may be obtained for five cents each, by addressing the "Commissioner of Patents, Washington, D. C."